US012760551B2

(12) United States Patent
Steven

(10) Patent No.: US 12,760,551 B2
(45) Date of Patent: Oct. 13, 2026

(54) CONNECTOR

(71) Applicant: Napkin Innovation Limited, Glasgow (GB)

(72) Inventor: Iain Steven, Hamilton (GB)

(73) Assignee: Napkin Innovation Limited, Glasgow (GB)

( * ) Notice: Subject to any disclaimer, the term of this patent is extended or adjusted under 35 U.S.C. 154(b) by 255 days.

(21) Appl. No.: 18/559,418

(22) PCT Filed: May 6, 2022

(86) PCT No.: PCT/EP2022/062370

§ 371 (c)(1),
(2) Date: Nov. 7, 2023

(87) PCT Pub. No.: WO2022/234132

PCT Pub. Date: Nov. 10, 2022

(65) Prior Publication Data

US 2024/0240616 A1 Jul. 18, 2024

(30) Foreign Application Priority Data

May 7, 2021 (GB) ...................................... 2106531

(51) Int. Cl.

*E04H 12/34* (2006.01)
*F03D 13/20* (2016.01)
*F16B 7/02* (2006.01)

(52) U.S. Cl.

CPC ......... *E04H 12/342* (2013.01); *F03D 13/205* (2023.08); *F16B 7/025* (2013.01); *Y10T 403/7069* (2015.01)

(58) Field of Classification Search

CPC ............ E04H 12/2253; E04H 12/2269; E04H 12/2276; E04H 12/342; F03D 13/205;
(Continued)

(56) References Cited

U.S. PATENT DOCUMENTS 2,245,316 A * 6/1941 Amsler .................... G01N 3/04 403/368
2,711,918 A 6/1955 George
(Continued)

FOREIGN PATENT DOCUMENTS

DE 2603488 A1 8/1977
DE 2759306 A1 * 6/1979 ............ F16D 1/093
(Continued)

OTHER PUBLICATIONS

PCT Search Report and Written Opinion for corresponding International Application Serial No. PCT/EP2020/062370, mailed Apr. 11, 2022, pp. 1-17.

*Primary Examiner* — Josh Skroupa

(57) ABSTRACT

A connector (200) for securing an inner tubular (105) to an outer tubular (107) includes an inner gripper (220), an outer gripper (210), and a wedge (230). The connector (200) is configured for location in an annulus between the inner and outer tubulars (105,107) and is moveable from a collapsed configuration, in which the inner tubular (105) can move relative to the outer tubular (107), to an expanded configuration, in which the inner tubular (105) is secured by the connector (200) to the outer tubular (107). In use, movement of the wedge (230) causes movement of an inner surface of the inner gripper (220) radially inwards towards the inner tubular (105) and/or movement of the outer surface of the outer gripper (210) radially outwards towards the outer tubular (107), thereby moving the connector (200) from the collapsed configuration to the expanded configuration.

22 Claims, 15 Drawing Sheets

(58) Field of Classification Search

CPC ...... F03D 13/206; F03D 13/25; F03D 13/256; F16B 7/02; F16B 7/025; F16B 7/1463; F16D 1/05; F16D 1/09; F16D 1/092; F16D 1/093; F16D 1/094; F16D 2001/0903; F16D 2001/0945; Y10T 403/32501; Y10T 403/7051; Y10T 403/7052; Y10T 403/7054; Y10T 403/7056; Y10T 403/7064; Y10T 403/7066; Y10T 403/7067; Y10T 403/7069

USPC ......... 52/651.08; 256/65.14; 403/109.5, 367, 403/368, 369, 370, 374.1, 374.2, 374.3, 403/374.4; 405/199, 227

See application file for complete search history.

(56) References Cited

U.S. PATENT DOCUMENTS

| | | | | | |
|---|---|---|---|---|---|
| 2,944,403 | A * | 7/1960 | Smith | E02B 17/0836 405/199 |
| 2,970,445 | A * | 2/1961 | Suderow | E02B 17/0836 405/199 |
| 3,584,473 | A * | 6/1971 | MacDonald | F16D 1/09 403/370 |
| 3,754,780 | A | 8/1973 | Pogonowski | |
| 4,245,928 | A | 1/1981 | Jo et al. | |
| 4,405,115 | A * | 9/1983 | Boyadjieff | E02B 17/0854 405/228 |
| 4,720,214 | A * | 1/1988 | Brasted | E02B 17/00 405/227 |
| 4,856,594 | A * | 8/1989 | Jennings | E21B 33/038 166/345 |
| 4,867,612 | A | 9/1989 | Bassett | |
| 5,639,176 | A * | 6/1997 | Mullenberg | F16D 1/093 403/368 |
| 5,826,847 | A * | 10/1998 | Warner | F16B 7/1463 248/200.1 |
| 6,375,383 | B1 * | 4/2002 | Ostling | F16D 1/094 403/374.1 |
| 6,736,027 | B2 * | 5/2004 | Ostling | F16D 1/094 403/374.1 |
| 9,618,051 | B2 * | 4/2017 | Heston | F16D 1/094 |
| 10,415,203 | B2 * | 9/2019 | Steven | B66C 1/44 |
| 10,508,399 | B1 | 12/2019 | Lee | |
| 2005/0089364 | A1 * | 4/2005 | Geib | F16D 1/093 403/370 |

FOREIGN PATENT DOCUMENTS

| | | | | |
|---|---|---|---|---|
| DE | 202006011099 U1 | 7/2007 | |
| EP | 3561201 A1 | 10/2019 | |
| GB | 1596926 A * | 9/1981 | E02B 17/027 |
| WO | WO-2009133601 A1 * | 11/2009 | F16B 7/025 |
| WO | 2019/161450 A1 | 8/2019 | |

* cited by examiner

CONNECTOR

RELATED APPLICATIONS

This application is a U.S. National Stage Application filed under 35 USC 371, claiming priority to Serial No. PCT/EP2022/062370, filed on 6 May 2022; which claims priority from GB Patent Application 2106531.3, filed 7 May 2021, the entireties of which are hereby incorporated herein by reference.

FIELD

The present invention relates to the field of connectors. Particularly, the invention relates to a connector for connecting offshore structures used in the offshore wind and oil and gas industries.

BACKGROUND

Offshore structures are commonly used to support energy generation equipment such as a wind turbine, or to provide a fixed platform whereby drilling, completion and production facilities and equipment can be located in oil and gas exploration and production. Smaller structures may be supported on a single tubular support member called a monopile, whilst large and expansive structures are supported on a jacket, which is a steel frame of members comprising legs which support the structure when in position.

There are three conventional methods of securing a single tubular support member or jacket structure with multiple support legs to the seabed. The first method is to secure one or more, typically steel, tubular members called piles in the seabed by driving the piles into the seabed. Once the piles are installed and secured in the seabed, each of the legs of the offshore structure can be lowered into a pile such that the leg is received within the pile. Securing of the legs into the piles is then required.

The second method is for jacket structures. Each leg of the jacket structure has a load distributing landing mat, which sits on the seabed. The jacket legs and mat may incorporate guide rings, through which piles are then driven.

The third method is also for jacket structures. Each leg of the jacket structure has a load distributing landing mat, which sits on the seabed. The jacket legs are open through-tubular members through which a pile is entered at the top and is lowered to and hammered into the seabed.

In first, second and third methods, a locking mechanism is required to secure the jacket to the piles to lock the jacket in place.

Typically, the legs are secured to the piles using a water resistant cement compound called grout, which is pumped into the annulus formed between each leg or each guide and the corresponding pile. The grout is left for a period of time to allow it to set and thereafter forms a strong bond between the leg and the pile.

The conventional method has many drawbacks. Firstly, when the legs initially interface with the piles it is difficult to align each tubular component, whether that be the leg or pile concentrically within the other. An eccentric leg and pile may result in a poor bond being formed on one side of the annular space because the annular space to be filled with grout is not sufficient. Even with concentric legs and piles, a large volume of grout is required to be transported to the offshore location, typically by supply boat. The grout must be mixed and prepared directly prior to use, therefore mixing and preparation of the grout must be performed on the supply boat at sea. The setting of the grout takes a significant amount of time, which increases the cost of installing the structure.

The use of grout also increases the risk of environmental harm to the subsea environment as the chemicals used are typically non-environmentally friendly. Finally, the described conventional method does not provide the ability to easily release the connection between the leg and the pile once they are secured, and therefore subsequent removal of the leg from the pile is complicated and time consuming.

It is an object of the invention to address at least one of the aforementioned problems.

SUMMARY

According to a first aspect of the invention, there is provided a connector for securing an inner tubular to an outer tubular. The connector comprising: an inner gripper comprising an inner gripper inner surface and an inner gripper outer surface; an outer gripper comprising an outer gripper inner surface and an outer gripper outer surface; and a wedge comprising a wedge inner surface and a wedge outer surface; wherein the connector is configured to be located in an annulus between the inner tubular and the outer tubular, and to be moveable from a collapsed configuration wherein the inner tubular can move relative to the outer tubular, to an expanded configuration wherein the inner tubular is secured by the connector to the outer tubular. The wedge is configured to be driven between and moveable relative to the inner gripper outer surface and the outer gripper inner surface such that in use movement of the wedge causes movement of the inner gripper inner surface radially inwards towards the inner tubular and/or movement of the outer gripper outer surface radially outwards towards the outer tubular, thereby moving the connector from the collapsed configuration towards the expanded configuration. In the expanded configuration the inner gripper inner surface is engaged with the inner tubular and the outer gripper outer surface is engaged with the outer tubular. This provides a secure method of connecting an inner and outer tubular without requiring grout or other bonding or cementing means.

The inner gripper, outer gripper and wedge may be of arcuate form. This provides the advantage of allowing the inner gripper, outer gripper and wedge to curve with the curvature of the inner and outer tubulars such that the connector can connect and achieve maximum secure surface contact with the inner and outer tubulars in the expanded configuration. The wedge may comprise a taper configured to push apart the inner and outer grippers as the wedge is driven therebetween in use. The taper allows a large surface contact area between the wedge and grippers, thus ensuring the grippers are not subject to point loading. The wedge outer surface may comprise a taper.

The outer gripper inner surface may comprise an opposing taper relative to the taper of the wedge outer surface, wherein the taper of the outer gripper inner surface is configured to register with the taper of the wedge outer surface. This allows the tapered faces to connect and achieve maximum secure surface contact and ensure point loading is avoided. The wedge inner surface may comprise a taper.

The inner gripper outer surface may comprise an opposing taper relative to the taper of the wedge inner surface, wherein the taper of the outer gripper outer surface is configured to register with the taper of the wedge inner surface. This allows the tapered faces to connect and achieve maximum secure surface contact and ensure point loading is avoided.

The outer gripper outer surface, inner gripper outer surface and wedge outer surface may be convex surfaces. The outer gripper inner surface, inner gripper inner surface and the wedge inner surface may be concave surfaces.

The outer gripper outer surface, wedge outer surface and inner gripper outer surface may be convex surfaces. The outer gripper inner surface, wedge inner surface and inner gripper inner surface may be concave surfaces.

One of the outer gripper and the inner gripper may comprise at least one guide pin and the other of the outer gripper and the inner gripper may comprise at least one guide groove or hole, wherein the at least one guide pin and the at least one guide groove or hole may be registered such that the at least one guide pin may be at least partially within the at least one guide groove or hole when the connector is in both the collapsed and the expanded configurations. This ensures that the inner and outer grippers are aligned in both the collapsed configuration and the expanded configuration, thus ensuring that the wedge is not twisted radially or subject to bending forces caused by misalignment of the grippers One of the outer gripper and the inner gripper may comprise a plurality of the guide pins and the other of the outer gripper and the inner gripper may comprise a plurality of the guide grooves or holes, wherein each guide pin may be registered with a corresponding guide groove or hole such that each guide pin may be at least partially within the corresponding guide groove or hole when the connector is in both the collapsed and the expanded configurations. This ensures that the inner and outer grippers are aligned in both the collapsed configuration and the expanded configuration, thus ensuring that the wedge is not twisted or subject to bending forces caused by misalignment of the grippers.

The inner gripper inner surface may comprise a region of increased friction configured to provide secure connection between the inner gripper inner surface and the inner tubular. This ensures that a secure connection is made between the connector and the inner tubular. The inner gripper inner surface may comprise serrations or a removable serrated inner insert. Serrations allow the inner gripper inner surface to bite into the inner tubular to ensure a secure connection is achieved. A removeable serrated inner insert allows the inner gripper to be made of a composite material with the removable serrated inner insert made of a harder material, thus the inner insert can be made cheaper and faster than making the entire assembly out of the harder and more expensive material. The outer gripper outer surface may comprise a region of increased friction configured to provide secure connection between the outer gripper outer surface and the outer tubular. This ensures that a secure connection is made between the connector and the outer tubular. The outer gripper outer surface may comprise serrations or a removable serrated outer insert. Serrations allow the outer gripper outer surface to bite into the outer tubular to ensure a secure connection is achieved. A removable serrated outer insert allows the outer gripper to be made of a composite material with the removable serrated outer insert made of a harder material, thus the outer insert can be made cheaper and faster than making the entire assembly out of the harder and more expensive material.

The outer gripper outer surface may comprise an engagement means configured to register with a corresponding engagement means of the outer tubular, such that movement of the outer gripper with respect to the outer tubular is stopped when the connector is in the expanded configuration. This ensures a secure connection is achieved between the connector and the outer tubular.

The connector may further comprise a mechanical actuator configured in use to be in operative engagement with the wedge to drive the wedge between the outer gripper and the inner gripper as the connector is moved from the collapsed configuration to the expanded configuration in use. This allows sufficient force to be applied to the wedge to drive the wedge between the inner and outer grippers to move the connector to the expanded configuration.

The connector may further comprise a locking mechanism configured to secure the mechanical actuator against the wedge when the connector is in the expanded configuration, thereby providing a continuous force on the mechanical actuator and the wedge, said force providing secure engagement of the inner gripper inner surface with the inner tubular and the outer gripper outer surface with the outer tubular. This allows the force of the mechanical actuator to be removed and a force to be constantly applied by the locking mechanism holding the mechanical actuator in place.

The connector may form a continuous ring such that the connector can be located in the annulus between the inner tubular and the outer tubular in use to provide a secure connection between the inner tubular and the outer tubular. This allows the connector to be positioned over the inner tubular such that it can be retained on the inner tubular as the inner tubular is run into the outer tubular. Furthermore, a continuous ring provides even setting forces around the annulus, ensuring a strong connection is formed around the entire annulus between the inner and outer tubulars.

There is also provided, a system of a plurality of connectors according the first aspect of the invention, wherein the connectors together may form a ring such that the connectors can be located in the annulus between the inner tubular and the outer tubular in use to provide secure connection between the inner tubular and the outer tubular. This allows even setting forces around the annulus, ensuring a strong connection is formed around the entire annulus between the inner and outer tubulars. The connectors may be arranged to form a continuous or non-continuous ring around the annulus in use.

According to a second aspect of the invention, there is provided a stab guide for concentrically aligning an inner tubular within an outer tubular as the inner tubular is brought within the outer tubular. The stab guide comprises an attachment means for attaching the stab guide to an end of the inner tubular and a tapered guiding surface configured to provide an increasing diameter as the inner tubular is brought within the outer tubular in use such that the inner tubular does not butt against the outer tubular. The tapered guiding surface has a largest diameter which is registered with the internal diameter of the outer tubular such that the inner and outer tubulars are concentric or nearer to being concentric. This concentricity allows an improved gripping bite serration connection to be achieved between the inner and outer tubulars because a more uniform annular gap is achieved where the gripping bite serration connection inserts complete the connection and secured locking.

According to a third aspect of the invention, there is provided a stab guide for concentrically aligning an inner tubular within an outer tubular as the inner tubular is brought within the outer tubular. The stab guide comprises an attachment means for attaching the stab guide to an end of the inner tubular and a tapered guiding surface configured to provide an increasing diameter as the inner tubular is brought within the outer tubular in use such that the inner tubular does not butt against the outer tubular. The tapered guiding surface has a largest diameter which is smaller than the internal diameter of the outer tubular and at least 90% the internal diameter of the outer tubular such that the inner and outer tubulars are substantially concentric. This improved concentricity allows an improved engagement and bite to be achieved between the inner and outer tubulars because a more uniform annular gap is achieved where the biting serration components will be located or where a connector will be located.

Optionally, the tapered guiding surface of the stab guide of the second or third aspect of the invention extends beyond the diameter of the inner tubular to form a ledge for positioning a connector thereon in the annulus between the inner and outer tubulars. This allows a connector to be protected from inadvertent and unwanted contact with outer tubular inner surface during insertion through being retained behind the stab guide lower landing surface outer diameter during its function of guiding the inner tubular as it is run within the outer tubular.

BRIEF DESCRIPTION OF THE DRAWINGS

Embodiments of the invention will now be described with reference to the following drawings, in which.

DETAILED DESCRIPTION OF THE DRAWINGS

Figure 1:
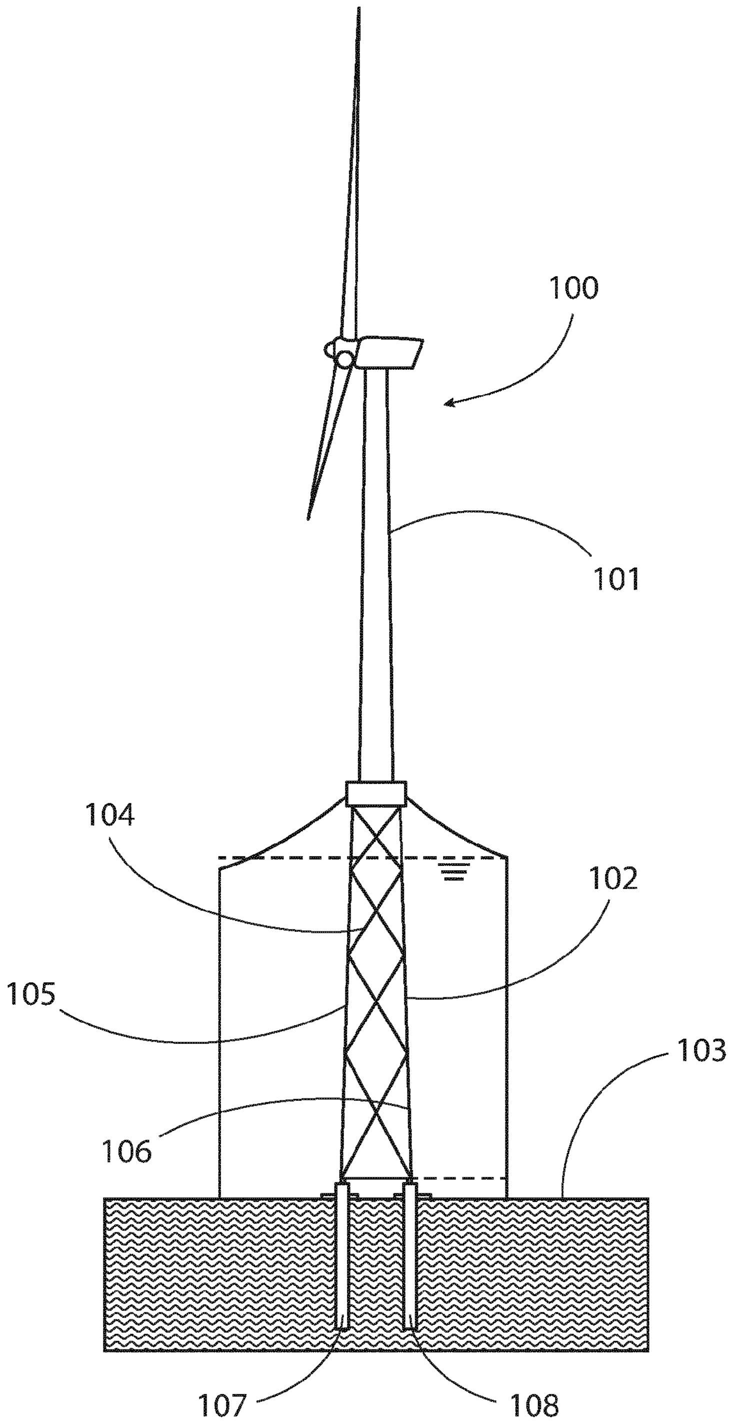
FIG. 1 shows a prior art connection of an offshore structure to a seabed.

FIG. 1 shows a wind turbine 100 comprising turbine tower 101 supporting various other conventional pieces of equipment. The turbine 100 is supported on a steel jacket 102 which secures the turbine tower 101 to the seabed 103 and supports the weight and forces of the wind turbine 100.

The steel jacket 102 comprises a frame of steel members 104 forming a triangular or square form jacket 102 and first 105, second 106, third (not shown) and/or fourth (not shown) legs. In the prior art method of securing the legs 105, 106 of the jacket 102 to the seabed 103, first 107 and second 108 piles are driven into the seabed 103 such that a major portion of each pile 107, 108 is secured into the seabed 103 and a minor portion of each pile 107, 108 extends to form a stick up from the seabed 103 allowing access to the piles 107, 108. The legs 105, 106 are lowered through the sea until the first leg 105 is received in the stick up of the first pile 107 and the second leg 106 is received in the stick up of the second pile 108. Similarly, the third and fourth legs are lowered and received in the stick up of the third and fourth piles (not shown).

Each of the legs 105, 106 is then secured to the corresponding pile 107, 108 by pumping grout into the annulus formed between the leg 105, 106 and the corresponding pile 107, 108. The grout is left to set and form a secure bond between each leg 105, 106 and the corresponding pile 107, 108.

Figures 2A, 2B, 2C, 2D:
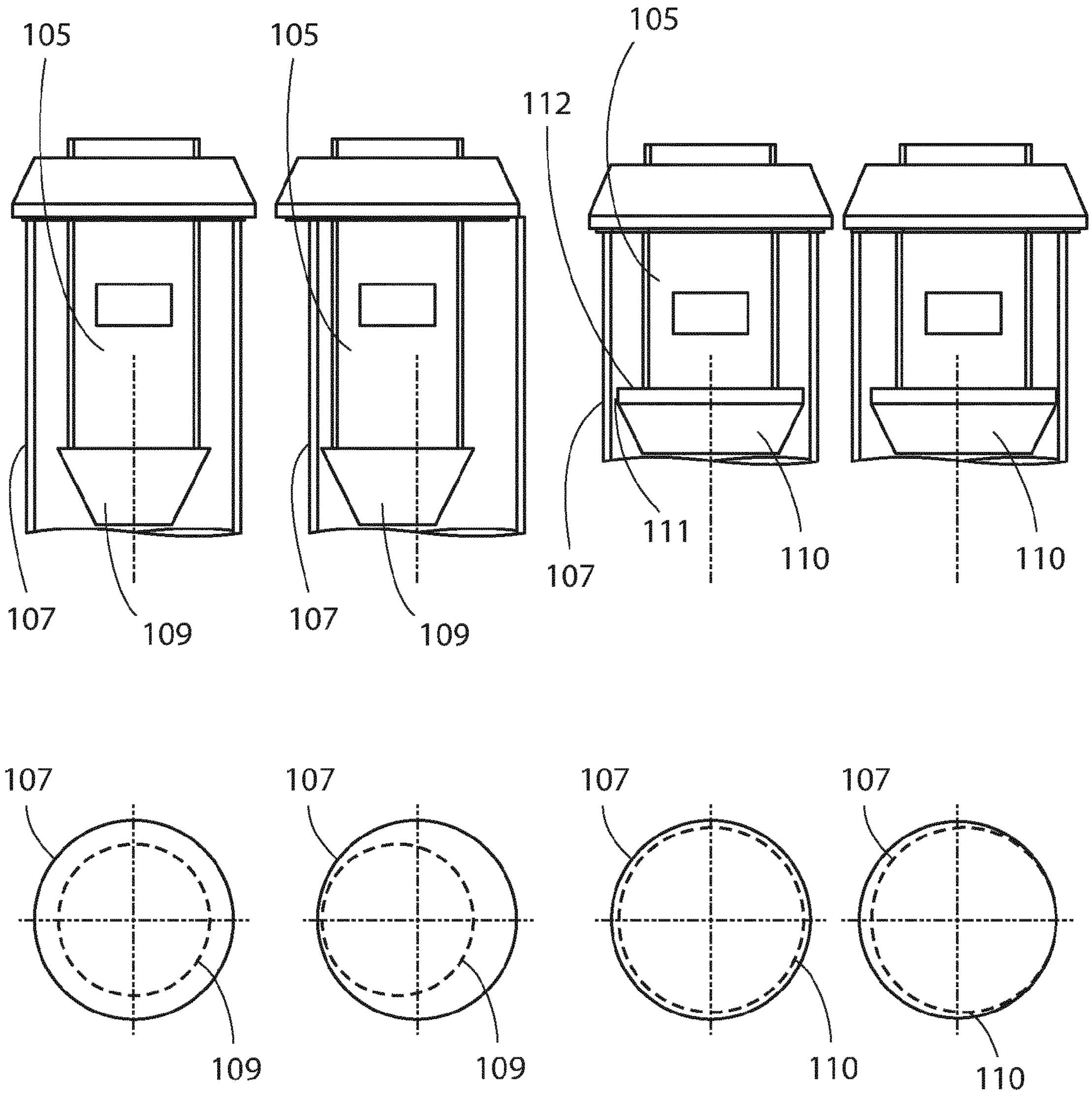
FIGS. 2*a* and 2*b* show a prior art stab guide for guiding a leg of an offshore structure within a pile.
FIGS. 2*c* and 2*d* show an example of a stab guide according to an aspect of the present invention.

FIGS. 2*a* and 2*b* show the first leg 105 being received within the first pile 107. The first leg 105 is typically mounted with a stab guide 109 at its lower end. The stab guide 109 is tapered to ensure that the leg 105 is drawn into the pile 107 and does not butt against the entrance of the pile 107 on entry. Concentricity between the leg 105 and the pile 107 is desired, as shown in FIG. 2*a*. However, the leg 105 can stray and become eccentric with respect to the pile 107, as shown in FIG. 2*b*.

According to an aspect of the invention, an improved stab guide 110 is provided. Similarly to the conventional stab guide 109 shown in FIGS. 2*a* and 2*b*, the improved stab guide 110 is tapered to ensure that the leg 105 is drawn into the pile 107 and does not butt against the entrance of the pile 107 on entry. Furthermore, the improved stab guide 110 has a diameter registered to be marginally smaller than the diameter of the pile 107, such that only a small gap 111 is present between the stab guide 110 and the pile 107 when the stab guide 110 is brought into the pile 107. The small gap 111 allows for a minimal tolerance of eccentricity, as shown in FIG. 2*d*, and thus an improved bond can be achieved between the leg 105 and the pile 107, because a more uniform annular gap is achieved where the bonding material will be located. Additionally, the improved stab guide 110 provides a ledge 112 such that alternative securing means can be retained by the ledge against the leg 105 as the leg 105 is lowered into the pile 107, as will be explained with reference to FIG. 3.

Figure 3:
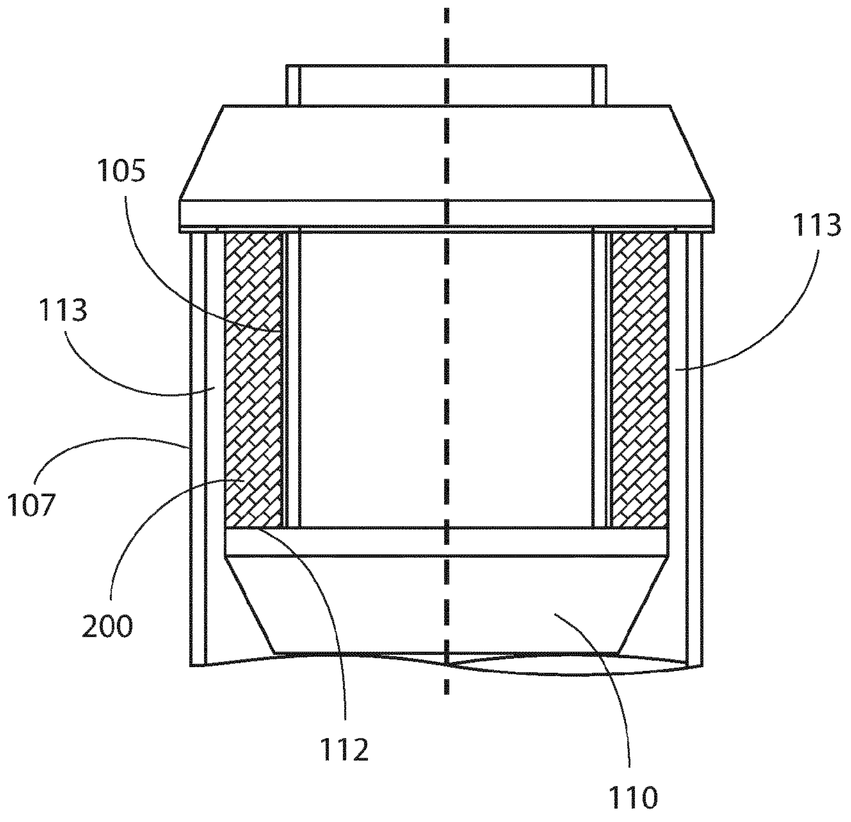
FIG. 3 shows an example of a connector according to another aspect of the present invention.

FIG. 3 shows a means of securing the leg 105 to the pile 107 in accordance with an aspect of the invention by using a connector 200 which does not require grout. The embodiment in FIG. 3 utilises the improved stab guide 110 of FIG. 2, wherein the connector 200 is seated on the ledge 112 such that the connector 200 is retained to the leg 105 as the leg 105 is lowered into the pile 107. It will become apparent to those skilled in the art that the connector 200 may also be used without the improved stab guide 110, whereby the connector is retained to the leg 105 during run-in using any other known means and is not supported on a ledge 112.

As shown in FIG. 3, the connector 200 is located in the annulus between the leg 105 and the pile 107, and is arranged to close a gap 113 in the annulus. There may be one connector 200 forming a continuous ring around the leg 105, or there may be several connectors 200 forming arcs around the leg 105. Preferably, where there are several connectors, each connector 200 is equally spaced around the leg 105. For example, there may be two or more connectors, where the connectors are arranged to provide substantially 360 degree support between the leg and pile.

Each connector may be of the same/similar circumferential extent or they may be different, but the combined extent of the connector elements is 360 degrees. In this regard, there may be four connectors each forming an arc of 90 degrees around the leg 105, or eight connectors each forming an arc of 45 degrees around the leg 105, or 12 connectors each forming an arc of 30 degrees around the leg 105. There may also be gaps between each of the connectors 200, for example there may be four connectors each forming an arc of 80 degrees around the leg 105.

The connector 200 is run into the annulus in a collapsed configuration shown in FIG. 3. The connector 200 is moved to an expanded configuration in which the connector 200 secures the leg 105 and pile 107 together, as will now be described in more detail.

Figure 4A:
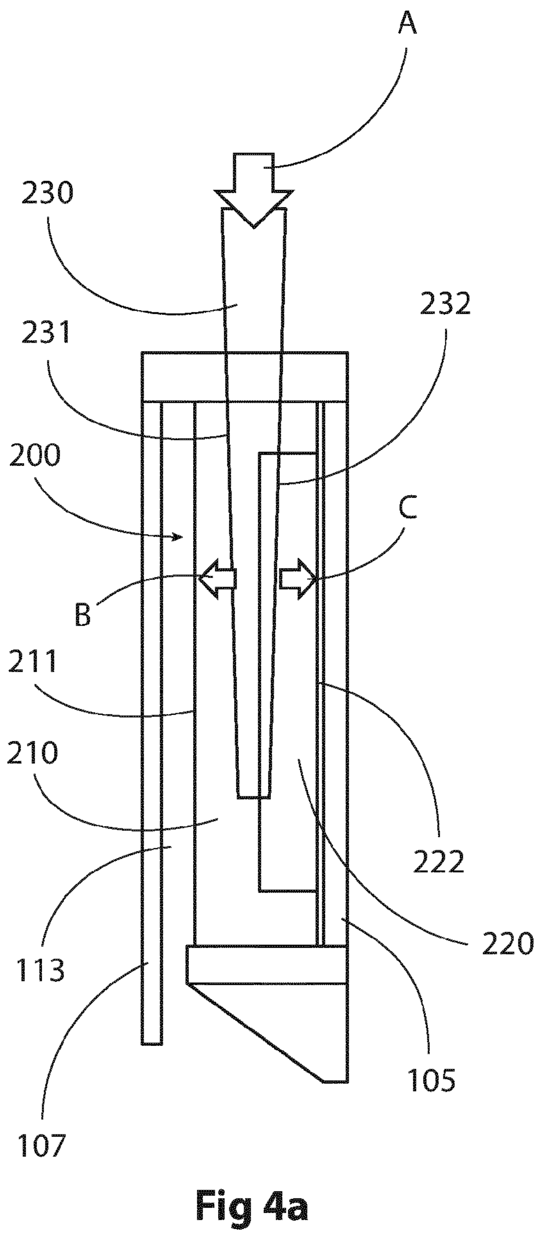
FIGS. 4*a* and 4*b* show cross-section views of the connector of FIG. 3 in the collapsed and expanded configurations respectively.

FIG. 4*a* shows a partial cross-sectional side view of the connector 200 in the collapsed configuration after the leg 105 has been run in to the pile 107. The connector 200 comprises an outer gripper 210, an inner gripper 220 and a wedge 230. The outer gripper 210 is of arcuate form and has an outer surface 211 which is registered with the inner surface of the pile 107 and an inner surface (not shown in FIG. 4*a*) which is registered with an outer surface 231 of the wedge 230. The inner gripper 220 is of arcuate form and has an outer surface (not shown in FIG. 4*a*) which is registered with the inner surface 232 of the wedge 230, and an inner surface 222 which is registered with the outer surface of the leg 105.

In the collapsed configuration shown in FIG. 4*a*, the outer gripper 210, inner gripper 220 and wedge 230 do not fill the gap 113 formed in the annulus between the leg 105 and the pile 107, therefore the connector 200 can be easily run in to position with the leg 105 as the leg 105 is inserted into the pile 107.

In preferred embodiments, the outer gripper 210 and inner gripper 220 are arranged to provide a cavity (not visible in FIG. 4*a* or 4*b*) therebetween in the collapsed configuration, for receiving the wedge 230 in said cavity. The wedge 230 may be run into the annulus with the outer 210 and inner grippers 220 or may be located into the cavity after the outer 210 and inner grippers 220 have been positioned ready for expansion. Alternatively, the outer 210 and inner grippers 220 may be arranged such that no cavity is formed therebetween in the collapsed configuration, and instead the outer 210 and inner grippers 220 are configured to be opened and be pushed apart by insertion of the wedge 230.

Once in the position shown in FIG. 4*a*, the connector 200 can be moved from the collapsed configuration in which the outer gripper 210 is not in contact with the pile 107, to the expanded configuration (see FIG. 4*b*) in which the outer gripper 210 is in contact with the pile 107. This is achieved by moving the wedge 230 from a first position, to a second position by inserting the wedge 230 further between the outer 210 and inner 220 grippers. Movement of the wedge 230 is caused by use of a mechanical actuator, as will be described in more detail below.

Figure 4B:
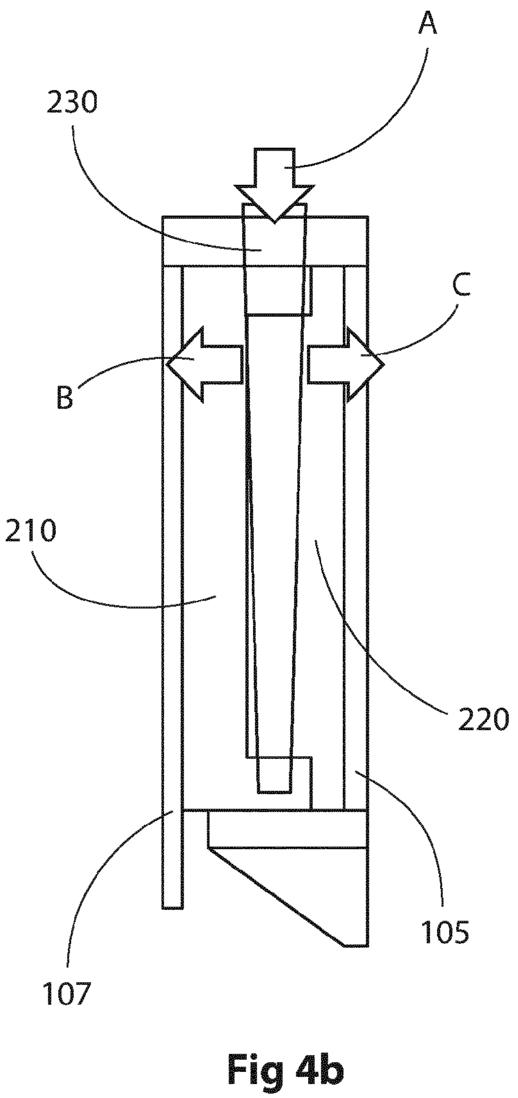

The wedge 230 comprises an elongate tapered profile as shown in FIGS. 4*a* and 4*b*, providing the wedge 230 with a narrower lower end and a wider upper end. It will be appreciated the wedge 230 may be inserted between the outer 210 and inner 220 grippers from the bottom rather than the top as in the described embodiment, in which case the wedge 230 would have a narrower upper end and a wider lower end.

Referring to FIG. 4*a* and FIG. 4*b*, to move the connector from the collapsed configuration to the expanded configuration, a mechanical force is applied to the wedge 230 in the direction of arrow A. The force may be applied by any suitable mechanical actuator, which may be attached to the connector 200 or leg 105, or may be a separate component. The force applied drives the outer gripper 210 in the direction of arrow B until the outer gripper 210 contacts the pile 107 and secures the outer gripper 210 thereto. At the same time, the force applied drives the inner gripper 220 in the direction of arrow C and secures the inner gripper 220 against the leg 105. Any gap or tolerance between the inner gripper 220 and the leg 105 is firstly closed by the movement of the inner gripper 220 before secure engagement of the inner gripper 220 and the leg 105 is achieved.

As shown in FIG. 4*b*, when the connector 200 is in the expanded configuration with the outer gripper 210 in contact with the pile 107 and the inner gripper in contact with the leg 105, a further setting force is applied in the direction of arrow A. This setting force is transferred by the wedge 230 to the outer 210 and inner 220 grippers to secure the outer 210 and inner 220 grippers against the pile 107 and leg 105 respectively. To provide a long term secure hold of the outer gripper 210 against the pile 107 and the inner gripper 220 against the leg 105, the setting force may be continuously applied or the force may be locked off by the application of a locking mechanism, as will be described in more detail later.

Figure 5:
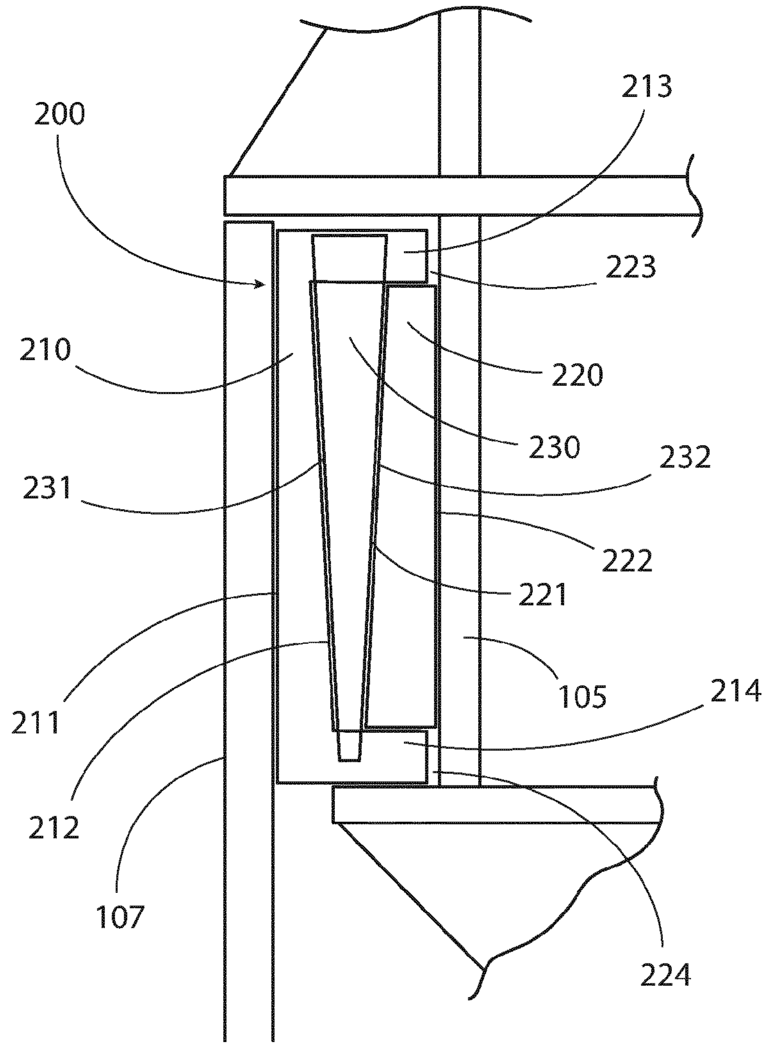
FIG. 5 shows a cross-section view of the connector of FIG. 3 in the expanded configuration.

FIG. 5 shows a partial cross-section view of the connector 200 in the expanded configuration. The registration of the inner surface 212 of the outer gripper 210 and the outer surface 231 of the wedge 230 can be seen in FIG. 5. The registration of the outer surface 221 of the inner gripper 220 and the inner surface 232 of the wedge 230 can also be seen in FIG. 5. To this end, the inner surface 212 of the outer gripper 210 and the outer surface 221 of the inner gripper 220 are tapered in the opposite direction to the taper of the wedge 230, such that movement of the wedge 230 further between the grippers 210, 220 pushes the grippers 210, 220 apart from the collapsed configuration, and applies the setting force on to each of the grippers 210, 220 when the connector 200 is in the expanded configuration. The described arrangement ensures that loading from the wedge 230 is not transferred at a single point on the outer 210 or inner 220 gripper, and instead the load is transferred over the faces of each of the grippers 210, 220.

Still referring to FIG. 5, the outer gripper 210 further comprises first 213, second 214, third (not shown) and fourth (not shown) guide pins. The first 213 and second 214 guide pins are arranged to mate with corresponding first 223 and second 224 guide grooves in the inner gripper 220, when the connector is in both the collapsed and expanded configurations. The mating of the guide pins 213, 214 and guide grooves 223, 224 ensures that the outer gripper 210 stays centred as it is expanded, thus ensuring that the force from the wedge 230 is transferred to the outer gripper 210 and inner gripper 230 at substantially the same region along the length of the wedge 230. This ensures that the wedge 230 is not bent or deformed during the transfer of force from the wedge 230 to the grippers 210, 220.

As previously discussed, the outer 210 and inner 220 grippers and wedge 230 are of arcuate form. To this end, the outer surface 211 of the outer gripper 210, the outer surface 221 of the inner gripper 220 and the outer surface 231 of the wedge 230 are all convex surfaces, whilst the inner surface 212 of the outer gripper 210, the inner surface 222 of the inner gripper 220 and the inner surface 232 of the wedge 230 are all concave surfaces. The concave and convex surfaces are not visible in FIG. 5.

Figure 6:
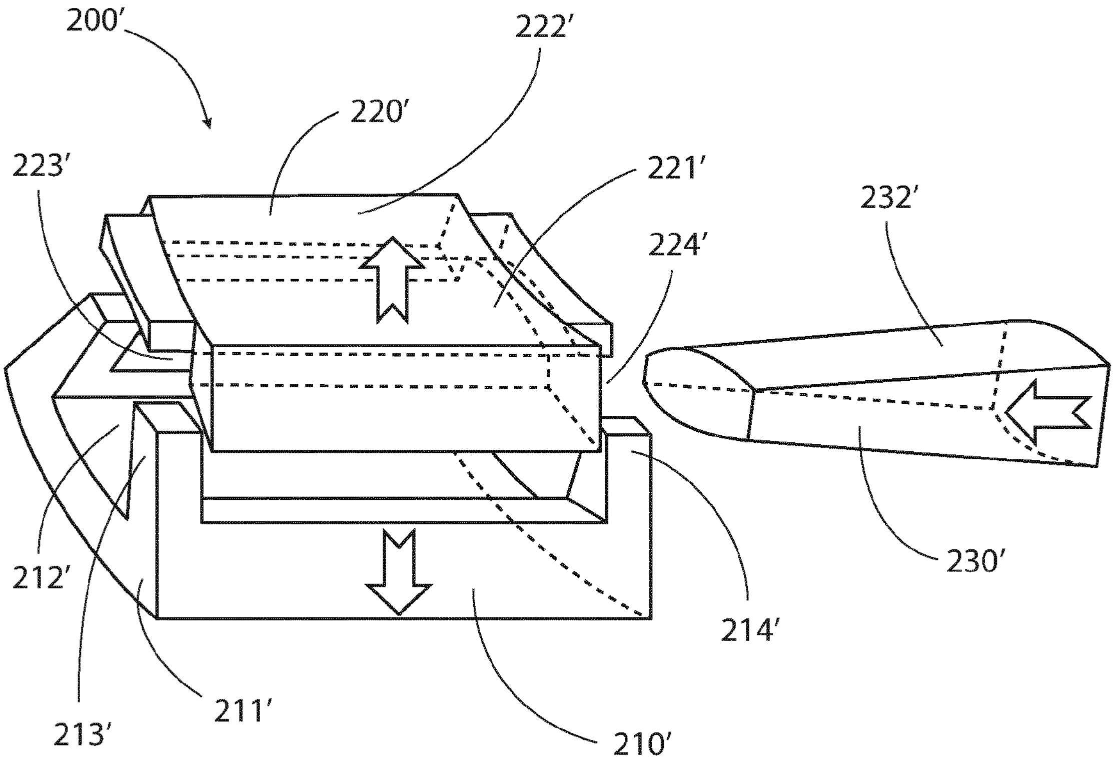
FIGS. 6 and 7 show further examples of connectors in accordance with the present invention.

FIG. 6 shows an exploded view of a gripper 200' according to an alternative embodiment. The inner surface 212' of the outer gripper 210' and the outer surface (not visible) of the wedge 230' are registered, whilst the outer surface 22T of the inner gripper 220' and the inner surface 232' of the wedge 230' are registered. The wedge 230' is tapered such that the thickness of the wedge 230' increases as it is inserted between the outer gripper 210' and the inner gripper 220'. The inner surface 212' of the outer gripper 210' and the outer surface 22T of the inner gripper 220' are tapered in the opposite direction to the taper of the wedge 230', such that movement of the wedge 230' further between the grippers 210', 220' pushes the grippers 210', 220' apart from the collapsed configuration, and applies the setting force on to each of the grippers 210', 220' when the connector 200' is in the expanded configuration.

Similarly to the embodiment described with reference to FIG. 5, the outer gripper 210' of the presently described embodiment comprises first 213' and second 214' guide pins which are arranged to mate with corresponding first 223' and second 224' guide grooves in the inner gripper 220', when the connector 200' is in both the collapsed and expanded configurations. This ensures that the outer gripper 210' stays centred as it is expanded, thus ensuring that the force from the wedge 230' is transferred to the outer gripper 210' and inner gripper 230' at substantially the same region along the length of the wedge 230'. This ensures that the wedge 230' is not bent or deformed during the transfer of force from the wedge 230' to the grippers 210', 220'.

In the presently described embodiment, the outer 210' and inner 220' grippers are of arcuate form, as shown in FIG. 6. To this end, the outer surface 21 T of the outer gripper 210', outer surface (not visible) of the wedge 230', and inner surface 232' of the wedge 230' are all convex surfaces, whilst the inner surface 212' of the outer gripper 210', the outer surface 22T of the inner gripper 220' and the inner surface 222' of the inner gripper 220' are all concave surfaces.

Figure 7:
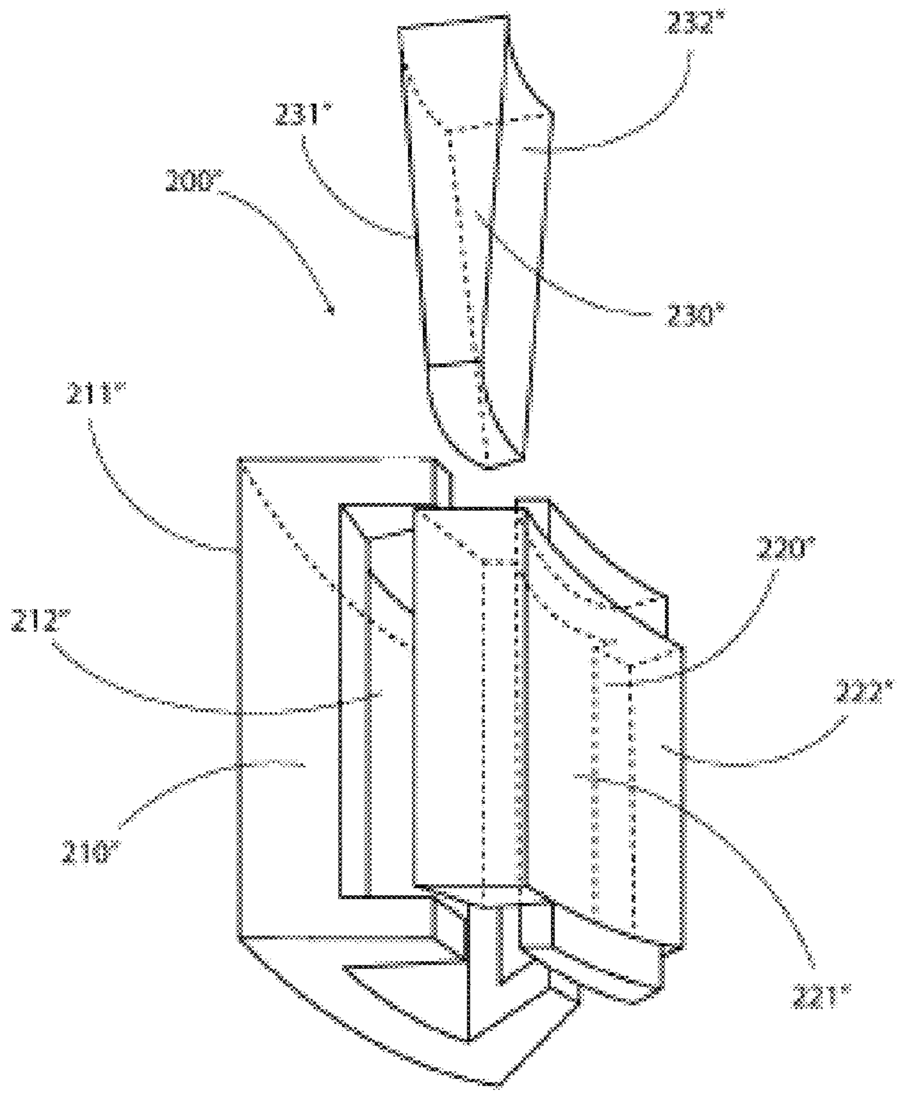

FIG. 7 shows an exploded view of a gripper 200" according to another alternative embodiment. As in previously described embodiments, the mating surfaces between the outer gripper 210" and the wedge 230", and between the wedge 230" and the inner gripper 210", are registered. However, in the presently described embodiment in FIG. 7, the outer surface 221" and inner surface 222" of the inner gripper 220" are parallel, thus the inner gripper 220" does not taper. Furthermore, the inner surface 232" of the wedge 230" is configured to register with the outer surface 221" of the inner gripper 220", and thus the inner surface 232" does not taper. The wedge 230" has a taper which is imparted by the tapering of the outer surface 231" from a narrow bottom to the wider top. It will again be appreciated that if the wedge 230" were arranged to be inserted between the grippers 210", 220" from the bottom rather than the top, the taper would be reversed. In either case, the taper provides that as the wedge 230" is inserted, the grippers 210", 220" are pushed apart.

Still referring to the embodiment in FIG. 7, the inner surface 212" of the outer gripper 210" is tapered in the opposite sense to the outer surface 231 of the wedge 230" such that movement of the wedge 230" further between the grippers 210", 220" pushes the outer grippers 210" apart from the collapsed configuration, and applies the setting force on to each of the grippers 210", 220" when the connector 200" is in the expanded configuration.

The outer surface 211 of the outer gripper 210", outer surface 231 of the wedge 230", and outer surface 221" of the inner gripper 220" are all convex surfaces, whilst the inner surface 212" of the outer gripper 210", the inner surface 232" of the wedge 230" and the inner surface 221" of the inner gripper 220" are all concave surfaces.

Figure 8:
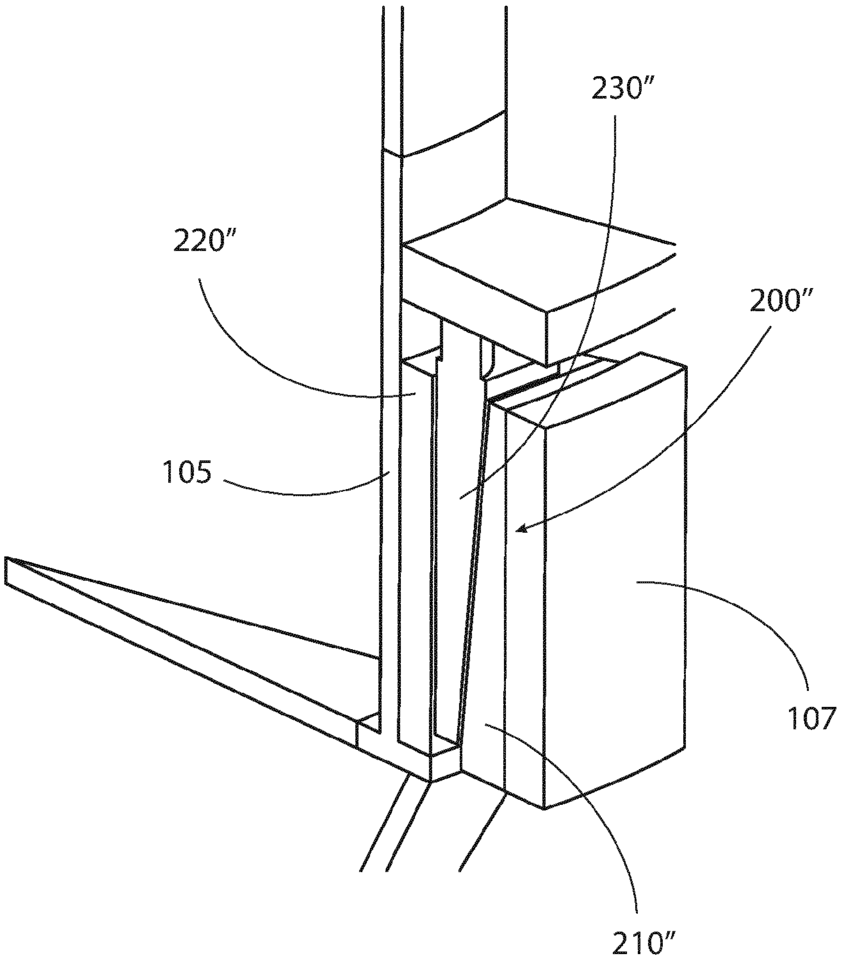
FIG. 8 shows a cross-section view of the connector shown in FIG. 7.

Referring now to FIG. 8, the connector 200" of FIG. 7 is shown in the expanded configuration. The inner gripper 220" can be seen in contact with the leg 105 on one side and the wedge 230" on the other side. The outer gripper 210" can be seen in contact with the pile 107 on one side and the wedge 230" on the other side. The wedge 230" is sandwiched between the inner gripper 220" and the outer gripper 210". The registered and opposing tapered faces of the wedge 230" and outer gripper 210" can be seen in FIG. 8.

Figure 9A:
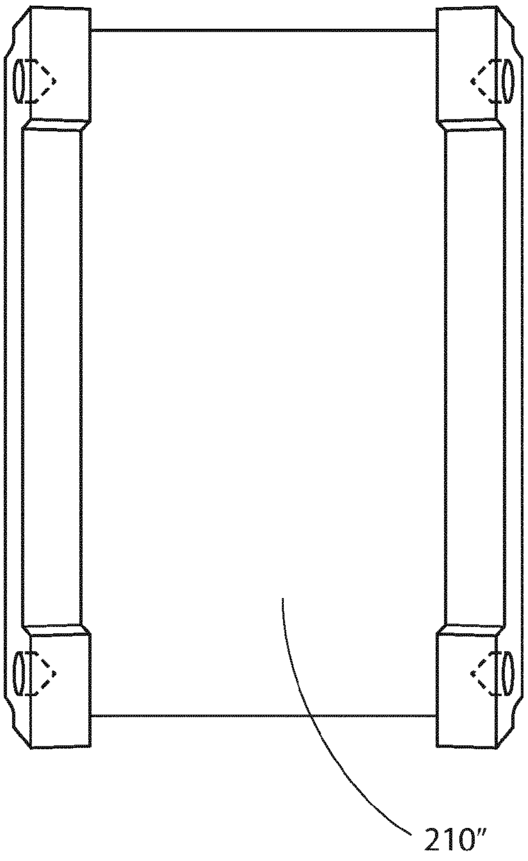
FIGS. 9*a*-9*e* show alternative views of the outer gripper of the connector shown in FIG. 7.
Figure 9B:
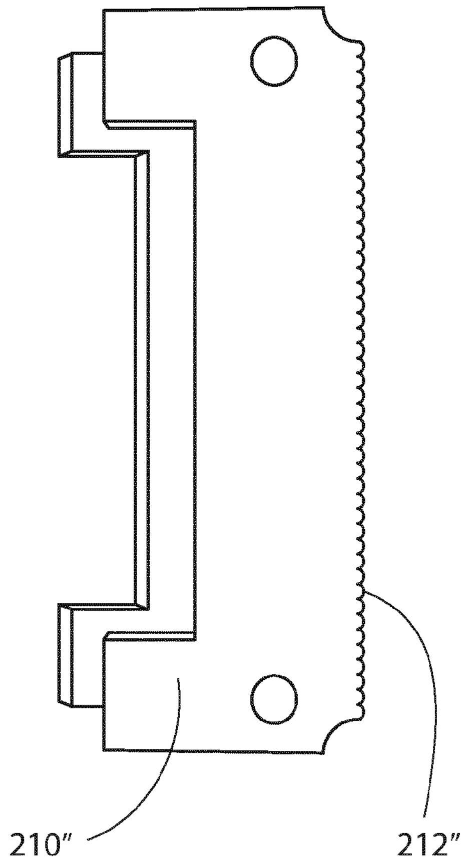
Figure 9C:
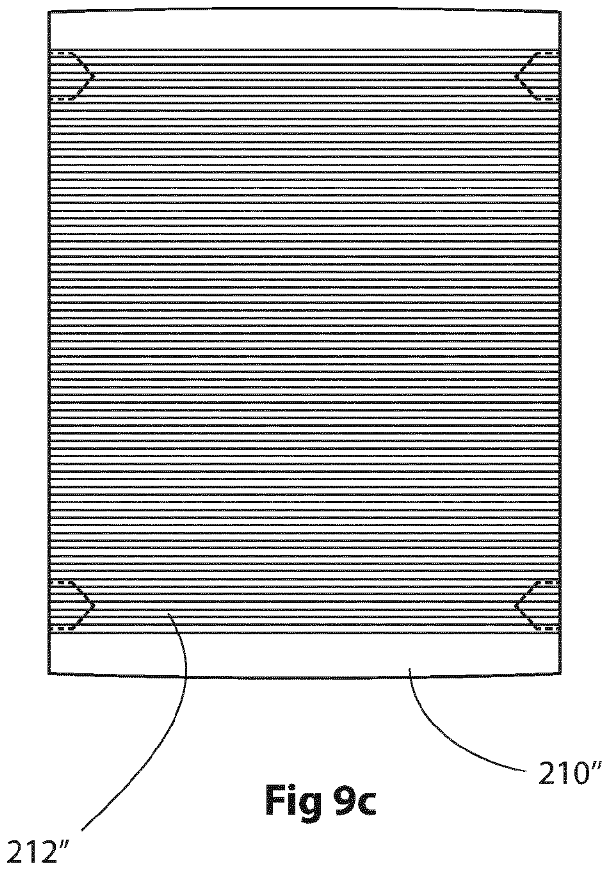
Figure 9D:
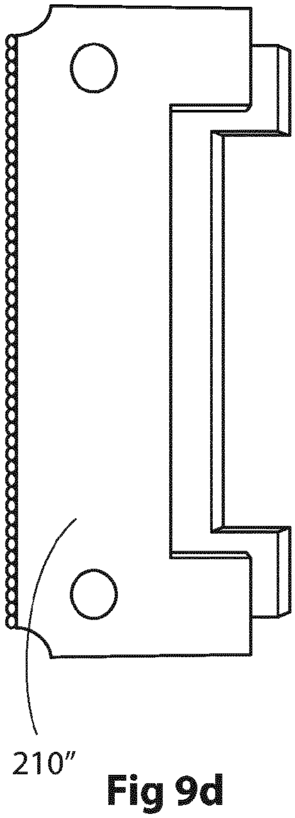
Figure 9E:
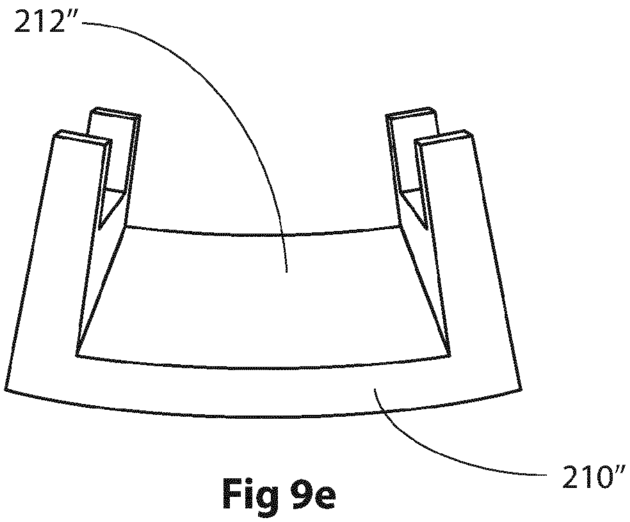
Figure 10A:
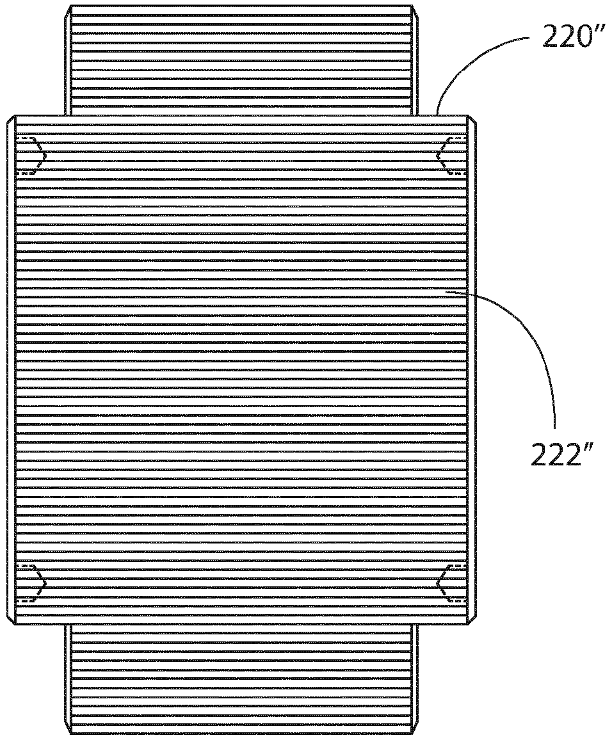
FIGS. 10*a*-10*d* show alternative views of the inner gripper of the connector shown in FIG. 7.
Figure 10B:
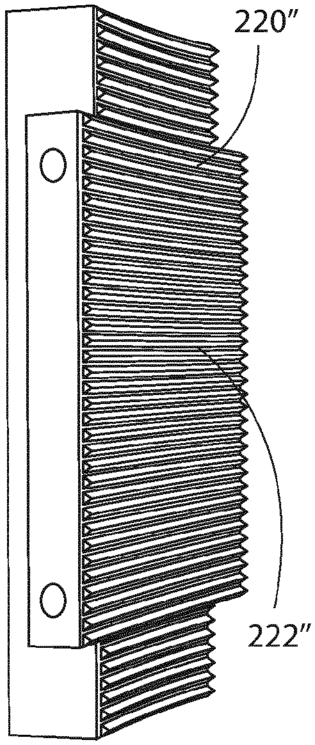
Figure 10C:
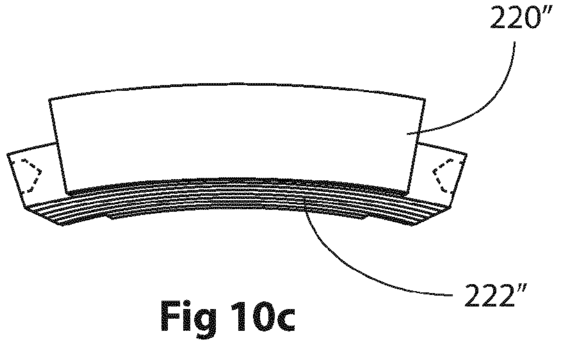
Figure 10D:
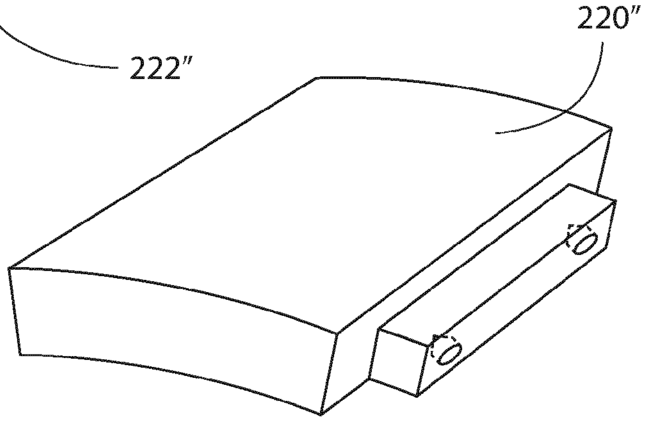

FIG. 9*a* shows the arcuate form of the outer gripper 210" (as described with reference to FIGS. 7 and 8). FIGS. 9*b* and 9*d* show side views of the outer gripper 210". The outer gripper 210" comprises a serrated outer surface 212" which is configured to engage with the pile 107 (see FIG. 8) and provide increased friction, thus providing a secure connection. The serrated outer surface 212" can be seen clearly in FIG. 9*c*. FIG. 9*e* shows a plan view of the outer gripper 210", where the tapered inner surface 212" of the outer gripper 210" can be seen.

The inner gripper 220" is shown in more detail in FIGS. 10*a*-10*d*. The inner gripper 220" comprises a serrated inner surface 222" which is configured to engage with the leg 105 (see FIG. 8) and provide increased friction, thus providing a secure connection.

It will be understood that serrated surfaces may be replaced by other mechanical or chemical means of increasing friction.

FIGS. 11 *a*-11 *d* show various views of the wedge 230". As shown in FIG. 11*a*, the wedge 230" comprises an actuator receiving socket 237" which is configured to receive a mechanical actuator to drive the wedge 230" downwards. In some alternative embodiments the mechanical actuator may be integrally formed with the wedge 230".

Figure 11A:
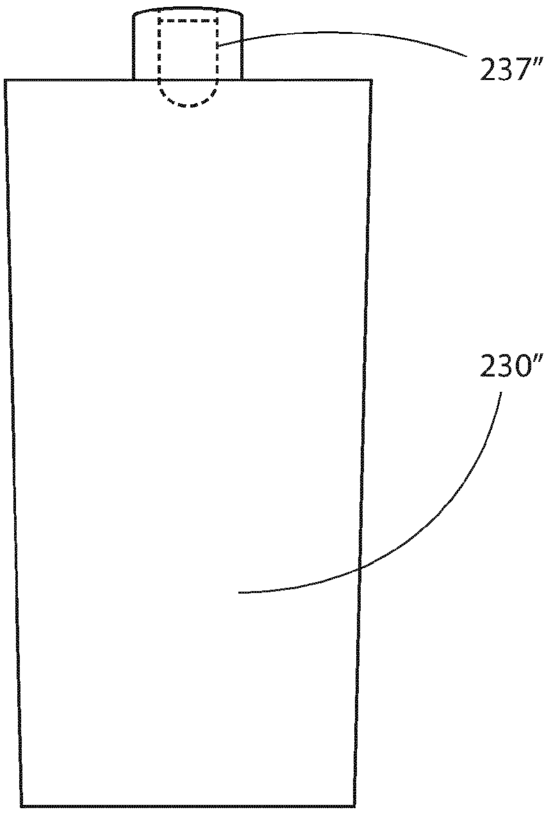
FIGS. 11 *a*-11 *d* show alternative views of the wedge of the connector shown in FIG. 7.
Figure 11B:
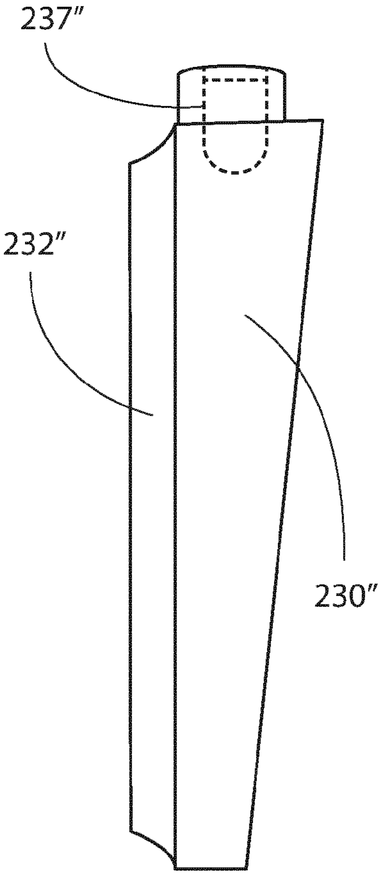
Figure 11C:
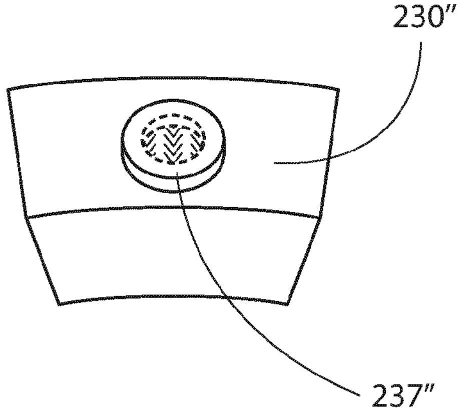
Figure 11D:
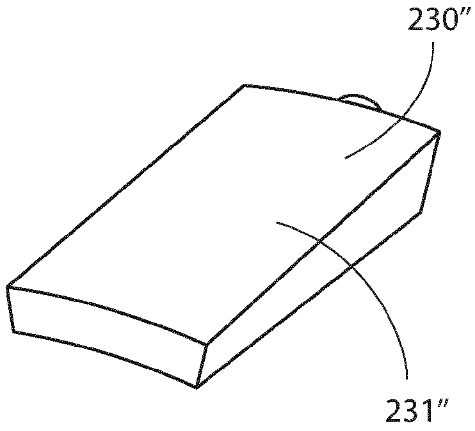

As previously discussed, and as now visible in FIG. 11*b*, the wedge 230" comprises an arcuate form with an inner surface 232" which is not tapered. As shown in FIG. 11 *d*, the outer surface 231" has a taper which is registered with the taper of the outer gripper 210" (see FIGS. 7 and 8).

Instead of or in addition to the serrated outer surface 212" (FIG. 9*a* to 9*d*) of the outer gripper 210", the outer surface 212" may further comprise engagement means 215" configured to register with corresponding engagement means in the pile 107. The engagement means 215" is shown in the form of protrusions in FIG. 12*a*. In such cases, the engagement means 215" is brought into alignment with the corresponding engagement means on the pile 107, such that when the connector 200" is moved from the collapsed configuration to the expanded configuration, the engagement means 215" is brought into engagement with the corresponding engagement means of the pile 107, thus securing the connector 200", and thus the leg 105, to the pile 107, as shown in FIG. 12*b*.

Figure 12A:
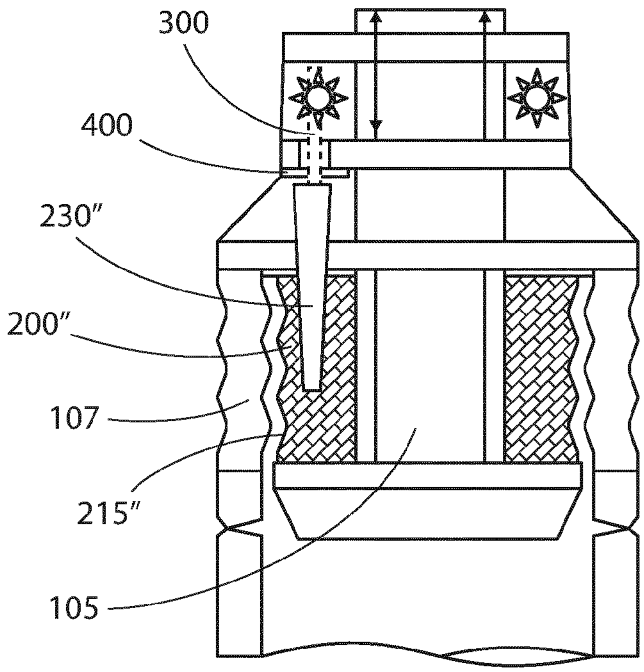
FIGS. 12*a* and 12*b* show additional features of the connector shown in FIG. 7.
Figure 12B:
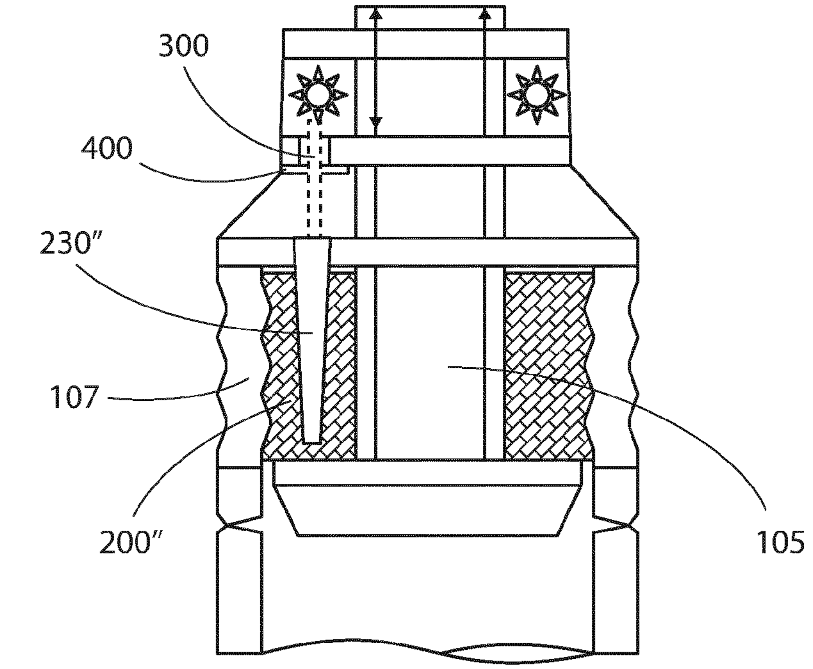

FIGS. 12*a* and 12*b* also show a mechanical actuator 300 and a locking mechanism 400 which may be used with any of the previously described embodiments. The mechanical actuator 300 is for driving the wedge 230" downwards from the position shown in FIG. 12*a* to the position shown in FIG. 12*b*, and further applying force to the wedge 230" in the form of setting force, as previously described. The locking mechanism 400 is for locking the force applied by the mechanical actuator 300 so that the setting force can easily be maintained on the wedge 230".

Figure 13:
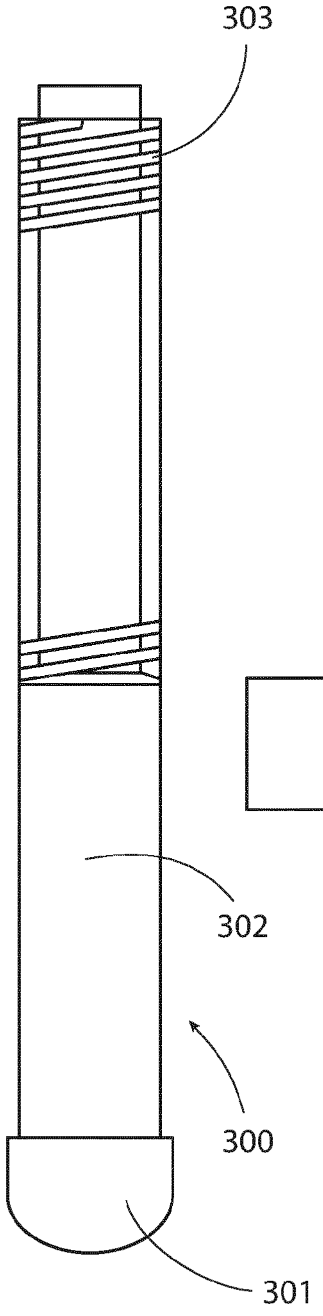
FIG. 13 shows a mechanical actuator.
Figure 14:
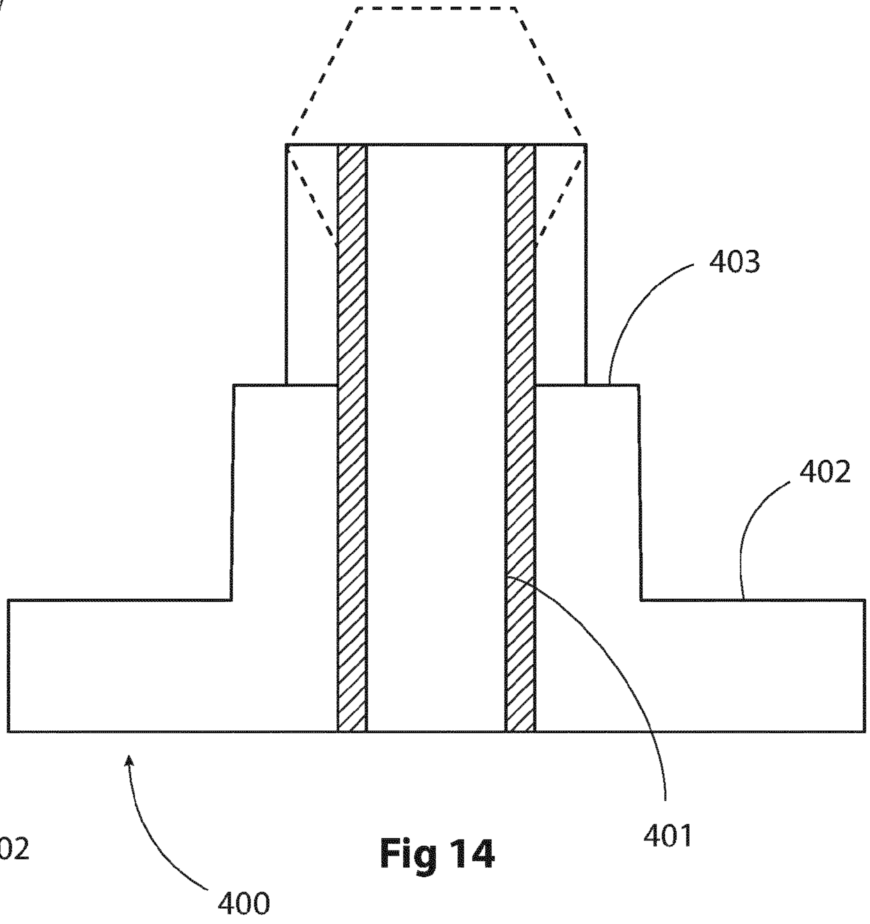
FIG. 14 shows a locking mechanism.

Referring now to FIGS. 13 and 14, aspects of the mechanical actuation are now described. FIG. 13 shows an example mechanical actuator 300 for driving the wedge 230" downwards. To this end, the mechanical actuator 300 comprises an actuator pin 301, a shaft 302 and a threaded portion 303. The actuator pin 301 is shaped and configured to be operatively received in the actuator receiving socket 237" of the wedge 230" (shown in FIGS. 11*a-c*). The upper end of the mechanical actuator 300 is connected in use to a suitable driving mechanism to provide a downwards force on the mechanical actuator 300 in use. As previously discussed, the downwards force may be continuously applied to apply a setting force on the wedge 230" and thus on the outer 210" and inner 220" grippers, or the setting force may be locked on by a suitable locking mechanism, for example the locking mechanism 400 shown in FIG. 14.

FIG. 14 shows a cross-section view of the example locking mechanism 400. The locking mechanism 400 comprises a through-bore 401 for allowing the shaft 302 of the mechanical actuator 300 to pass therethrough. The locking mechanism 400 further comprises a threaded portion (not shown) which is configured to engage with the threaded portion 303 of the mechanical actuator 300 to secure the mechanical actuator 300 in place when the mechanical actuator 300 has been driven down by sufficient force. The locking mechanism 400 further comprises engagement surfaces 402, 403 which allow the locking mechanism 400 to remain seated within a stationary component of the subsea architecture, and receive an upward force from the mechanical actuator 300 when the mechanical actuator 300 is set holding the wedge 230" and outer 210" and inner 220" grippers in the expanded configuration with a setting force. The described arrangement allows the setting force to be locked off by the locking mechanism 400 and thus a continuously applied setting force is not required.

Figure 15A:
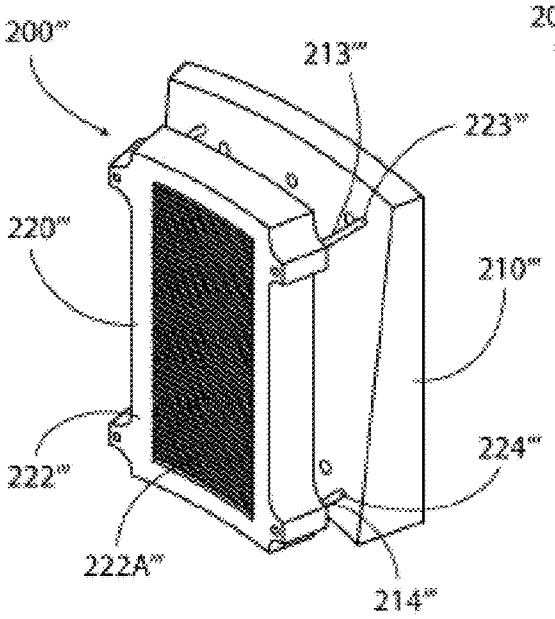
FIGS. 15*a* and 15*b* show alternative views of a connector according to another embodiment of the present invention.
Figure 15B:
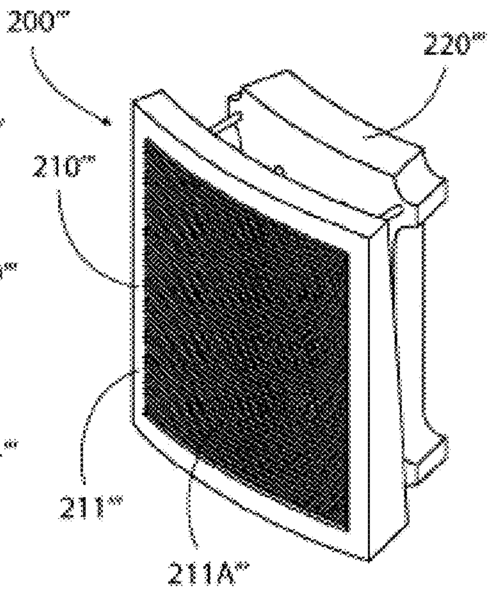

FIGS. 15*a* and 15*b* show components of a connector 200'" according to an alternative embodiment of the invention. In this embodiment, the connector 200'" comprises guide pins 213'", 214'" which align the inner gripper 220'" with the outer gripper 210'" by receipt of the guide pins 213'", 214'" in corresponding guide holes 223'", 224'" in the outer gripper 210'". The guide pins 213'", 214'" may be integrally formed with the inner gripper 220'" or may be separate components which are received in holes within the inner gripper 220'". In some embodiments there may be one guide pin 213'". In some embodiments there may be two guide pins 213'", 214'". In some embodiments there may be three or four or more guide pins. There will be a corresponding number of guide holes for receiving the guide pins. In FIG. 15*a* it can be seen that in this embodiment the inner surface 222'" of the inner gripper 220'" comprises a serrated inner insert 222*k*'" which is received within a recess in the inner surface 222'". In FIG. 15*b* it can be seen that in this embodiment the outer surface 211'" of the outer gripper 210'" comprises a serrated outer insert 211A'". This configuration allows the serrated inner insert 222*k*'" and serrated outer insert 211 A'" to be easily replaced when worn, without having to manufacture an entire new inner gripper 220'" or outer gripper 210'".

Figure 15C:
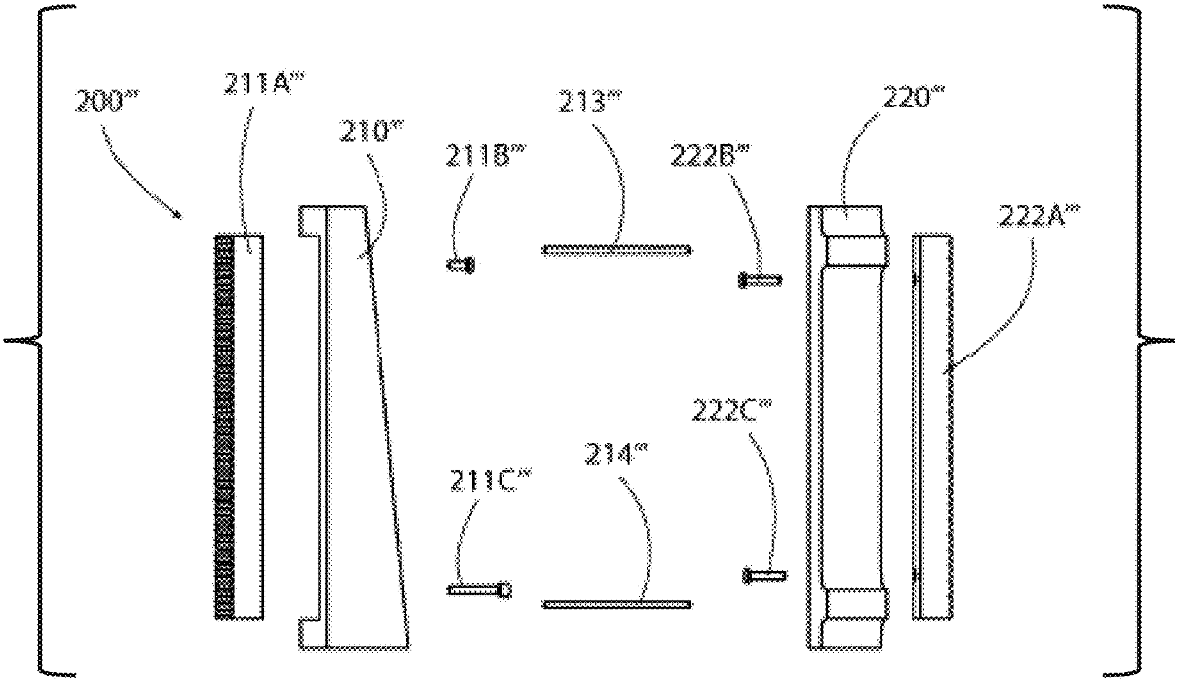

The described configuration with respect to FIGS. 15*a* and 15*b* can be seen in the exploded view shown in FIG. 15*c*. The serrated inner insert 222*k*'" is received within the inner gripper 220'" and is held securely within the inner gripper 220'" by screws 222B'", 222C'". The serrated outer insert 211 A'" is received within the outer gripper 210'" and is held securely within the outer gripper 210'" by screws 211B"211C'". Guide pins 213'", 214'" align the inner gripper 220'" and outer gripper 210'". It will be understood that the screws 211 B'", 211C'", 222B'", 222C'" may be replaced by any suitable fixing means/fasteners to secure and retain the serrated inner insert 222A'" and serrated outer insert 211A'" within the respective grippers 220'", 210'".

Whilst specific embodiments of the present invention have been described above, it will be appreciated that departures from the described embodiments may still fall within the scope of the claims.

The invention claimed is:

1. A connector for securing an inner tubular to an outer tubular, the connector comprising:
- an inner gripper comprising an inner gripper inner surface and an inner gripper outer surface;
- an outer gripper comprising an outer gripper inner surface and an outer gripper outer surface;
- and a wedge comprising a wedge inner surface and a wedge outer surface;
- wherein the connector is configured to be located in an annulus between the inner tubular and the outer tubular, and to be moveable from a collapsed configuration wherein the inner tubular can move relative to the outer tubular, to an expanded configuration wherein the inner tubular is secured by the connector to the outer tubular,
- wherein the wedge is configured to be driven between and moveable relative to the inner gripper outer surface and the outer gripper inner surface such that movement of the wedge causes movement of the inner gripper inner surface radially inwards and/or movement of the outer gripper outer surface radially outwards, thereby moving the connector from the collapsed configuration towards the expanded configuration,
- wherein one of the outer gripper and the inner gripper comprises at least one guide pin and the other of the outer gripper and the inner gripper comprises at least one guide groove or hole,
- and wherein the at least one guide pin and the at least one guide groove or hole are registered such that the at least one guide pin is at least partially within the at least one guide groove or hole when the connector is in both the collapsed and the expanded configurations,
- the at least one guide pin being registered with and at least partially within the at least one guide groove or hole to ensure that the inner gripper and the outer gripper are aligned and/or the outer gripper stays centred in the guide groove or hole in both the collapsed configuration and the expanded configuration.

2. The connector according to claim 1, wherein the inner gripper, outer gripper and wedge are of arcuate form.

3. The connector according to claim 1, wherein the wedge comprises a taper configured to push apart the inner and outer grippers as the wedge is driven there between in use.

4. The connector according to claim 3, wherein the wedge outer surface comprises a taper.

5. The connector according to claim 4, wherein the outer gripper inner surface comprises an opposing taper relative to the taper of the wedge outer surface, wherein the taper of the outer gripper inner surface is configured to register with the taper of the wedge outer surface.

6. The connector according to claim 3, wherein the wedge inner surface comprises a taper.

7. The connector according to claim 6, wherein the inner gripper outer surface comprises an opposing taper relative to the taper of the wedge inner surface, wherein the taper of the inner gripper outer surface is configured to register with the taper of the wedge inner surface.

8. The connector according to claim 1, wherein at least one of:
- the outer gripper outer surface, inner gripper outer surface and wedge outer surface are convex surfaces;
- the outer gripper inner surface, inner gripper inner surface and the wedge inner surface are concave surfaces;

the outer gripper outer surface, wedge outer surface and wedge inner surface are convex surfaces;

the outer gripper inner surface, inner gripper outer surface and inner gripper inner surface are concave surfaces.

9. The connector according to claim 1, wherein one of the outer gripper and the inner gripper comprises a plurality of the guide pins and the other of the outer gripper and the inner gripper comprises a plurality of the guide grooves, wherein each guide pin is registered with a corresponding guide groove such that each guide pin is at least partially within the corresponding guide groove when the connector is in both the collapsed and the expanded configurations.

10. The connector according to claim 1, wherein the inner gripper inner surface comprises a region of increased friction configured to provide a secure connection between the inner gripper inner surface and the inner tubular.

11. The connector according to claim 10, wherein the inner gripper inner surface comprises serrations or a removable serrated inner insert.

12. The connector according to claim 1, wherein the outer gripper outer surface comprises a region of increased friction configured to provide secure connection between the outer gripper outer surface and the outer tubular.

13. The connector according to claim 12, wherein the outer gripper outer surface comprises serrations or a removable serrated outer insert.

14. The connector according to claim 1, wherein the outer gripper outer surface comprises an engagement means configured to register with a corresponding engagement means of the outer tubular, such that movement of the outer gripper with respect to the outer tubular is stopped when the connector is in the expanded configuration.

15. The connector according to claim 1, wherein the connector further comprises a mechanical actuator configured in use to be in operative engagement with the wedge to drive the wedge between the outer gripper and the inner gripper as the connector is moved from the collapsed configuration to the expanded configuration in use.

16. The connector according to claim 15, further comprising a locking mechanism configured to secure the mechanical actuator against the wedge when the connector is in the expanded configuration, thereby providing a continuous force on the mechanical actuator and the wedge, said force providing secure engagement of the inner gripper inner surface with the inner tubular and the outer gripper outer surface with the outer tubular.

17. The connector according to claim 1, wherein the connector forms a continuous ring such that the connector can be located in the annulus between the inner tubular and the outer tubular in use to provide a secure connection between the inner tubular and the outer tubular.

18. A system of a plurality of connectors according to claim 1, wherein the connectors together form a ring such that the connectors can be located in the annulus between the inner tubular and the outer tubular in use to provide secure connection between the inner tubular and the outer tubular.

19. The system of claim 18, wherein the connectors are arranged to form a continuous or non-continuous ring around the annulus in use.

20. In combination, the connector of claim 1 and a stab guide for concentrically aligning the inner tubular within the outer tubular as the inner tubular is brought within the outer tubular, the stab guide comprising:

an attachment means for attaching the stab guide to an end of the inner tubular; and a tapered guiding surface configured to provide an increasing diameter as the inner tubular is brought within the outer tubular in use such that the inner tubular does not butt against the outer tubular;

wherein at least one of:

the tapered guiding surface has a largest diameter which is registered with the internal diameter of the outer tubular such that the inner and outer tubulars are concentric; and the tapered guiding surface has a largest diameter which is smaller than the internal diameter of the outer tubular and at least 90% the internal diameter of the outer tubular such that the inner and outer tubulars are substantially concentric.

21. The connector according to claim 1, wherein in the expanded configuration the inner gripper inner surface is engaged with the inner tubular and the outer gripper outer surface is engaged with the outer tubular.

22. The combination of claim 20, wherein the tapered guiding surface extends beyond the diameter of the inner tubular to form a ledge for positioning a connector thereon in the annulus between the inner and outer tubulars.

* * * * *